US005255017A

United States Patent [19]

Lam

[11] Patent Number: 5,255,017

[45] Date of Patent: Oct. 19, 1993

[54] THREE DIMENSIONAL NOZZLE ORIFICE PLATES

[75] Inventor: Si-Ty Lam, San Jose, Calif.

[73] Assignee: Hewlett-Packard Company, Palo Alto, Calif.

[21] Appl. No.: 621,506

[22] Filed: Dec. 3, 1990

[51] Int. Cl.[5] B41J 2/16; C25D 1/08

[52] U.S. Cl. 346/140 R; 205/75

[58] Field of Search 346/140 R, 75; 205/75

[56] References Cited

U.S. PATENT DOCUMENTS

| | | | |
|---|---|---|---|
| 2,870,068 | 1/1959 | Schaer . | |
| 4,528,070 | 7/1985 | Gamblin | 204/11 |
| 4,773,971 | 9/1988 | Lam et al. | 204/11 |
| 4,801,947 | 1/1989 | Lichtenberger et al. | 346/75 |
| 4,954,225 | 9/1990 | Bakewell | 204/11 |

FOREIGN PATENT DOCUMENTS

| | | |
|---|---|---|
| 0193678 | 12/1985 | European Pat. Off. . |
| 2363643 | 9/1976 | France . |

OTHER PUBLICATIONS

Database WPIL, Derwart Publications, Ltd., Nov. 1990, abstract.

Gary L. Siewell et al., "The Thinkjet Orifice Plate: A Part With Many Functions", Hewlett-Packard Journal, May 1985, pp. 33-37.

Hue Le et al., "Air-Assisted Ink Jet With Mesa-Shaped Ink-Drop-Forming Orifice", The 4th International Congress on Advances in Non-Impact Printing Technologies, New Orleans LA, Mar. 1988, pp. 223-227.

*Primary Examiner*—Benjamin R. Fuller
*Assistant Examiner*—Alrick Bobb

[57] ABSTRACT

A process of forming a mandrel for manufacturing ink-jet orifice plates and the like includes the steps of providing an electrically-conductive layer on a substrate, providing a pattern of electrically conductive surfaces on the conductive layer, and surface treating the pattern of conductive surfaces to reduce adhesion of a subsequently applied electroplated film to the pattern of conductive surfaces. The mandrel includes a substrate, a pattern of electrically conductive surfaces on the substrate and an oxide layer on the pattern of conductive surfaces for reducing adhesion of an electroplated film to the pattern of conductive surfaces. The pattern of conductive surfaces can be an electro-deposited layer of nickel, and the release means can be a nickel oxide and/or nickel hydroxide film on the layer of nickel.

3 Claims, 6 Drawing Sheets 6b
3
6
6a

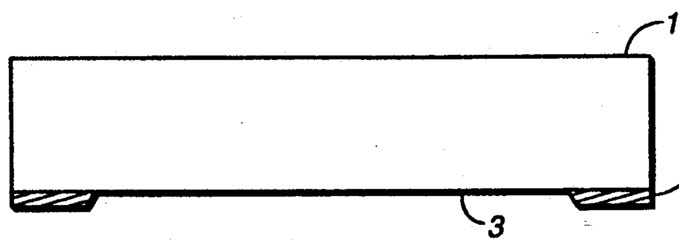
FIG._1a
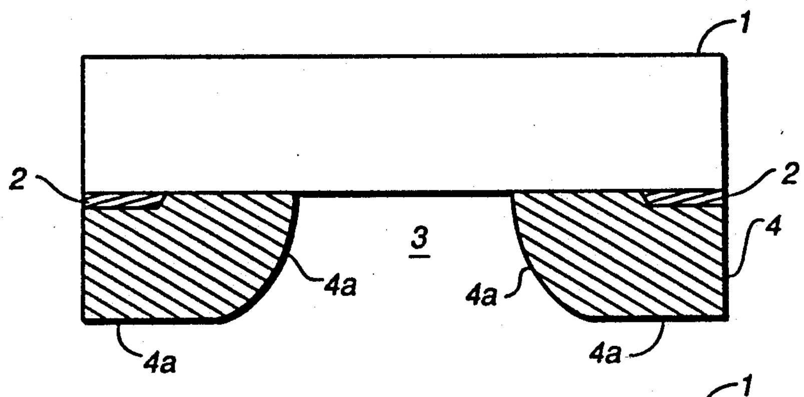
FIG._1b
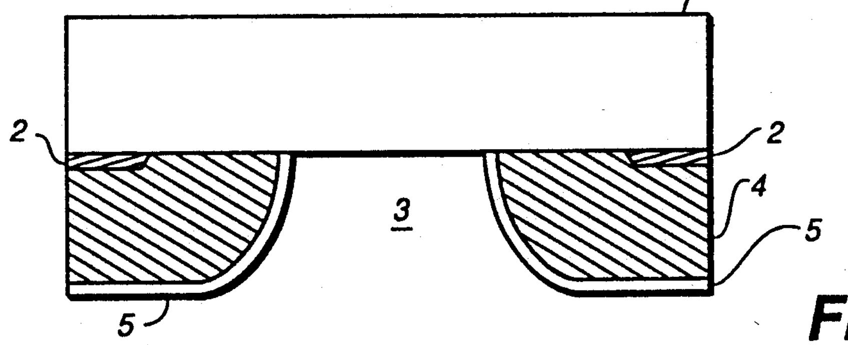
FIG._1c
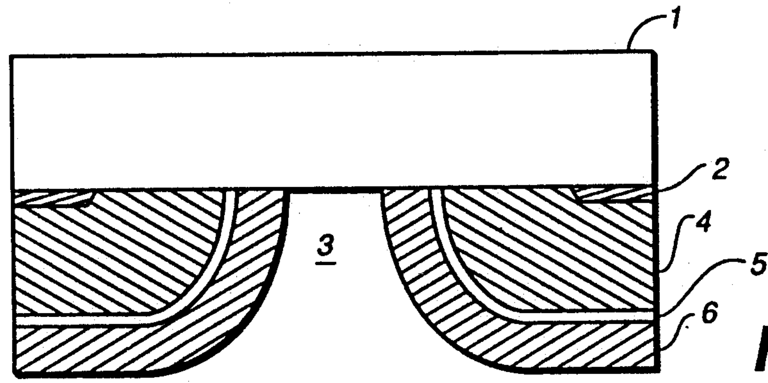
FIG._1d
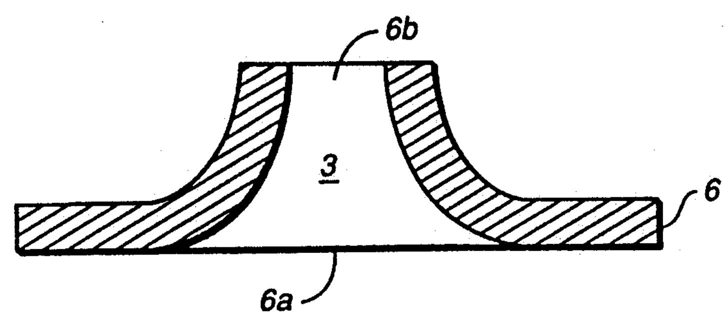
FIG._1e

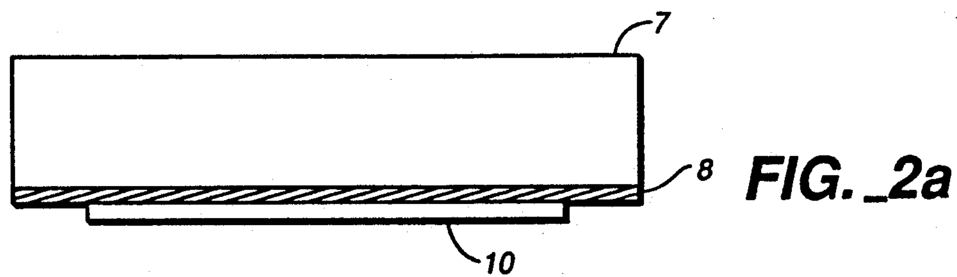
FIG._2a
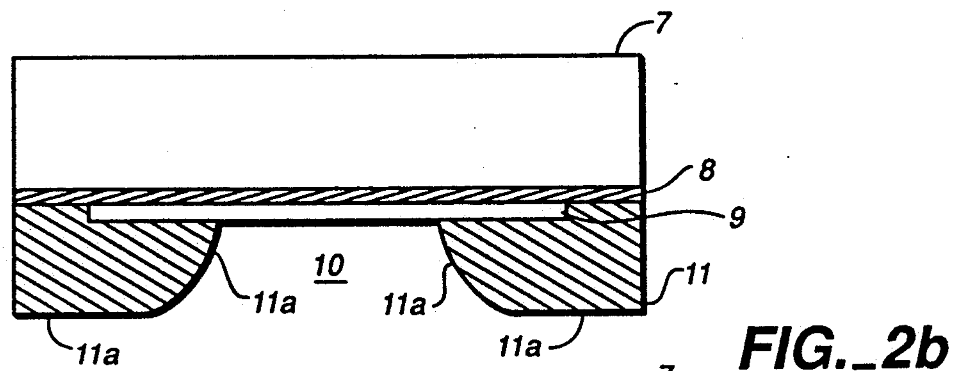
FIG._2b
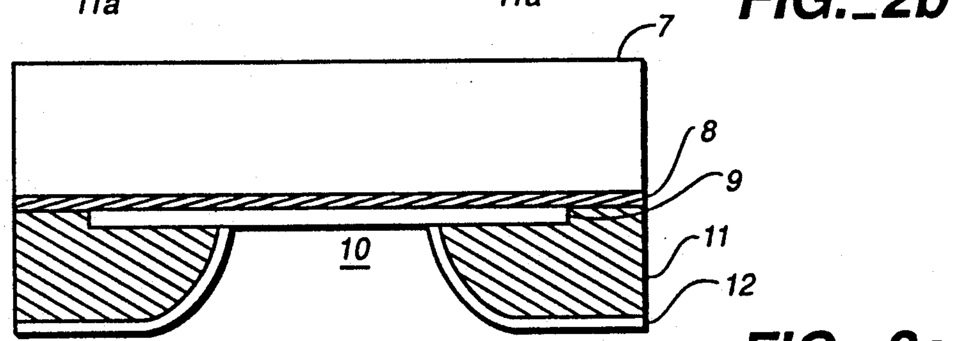
FIG._2c
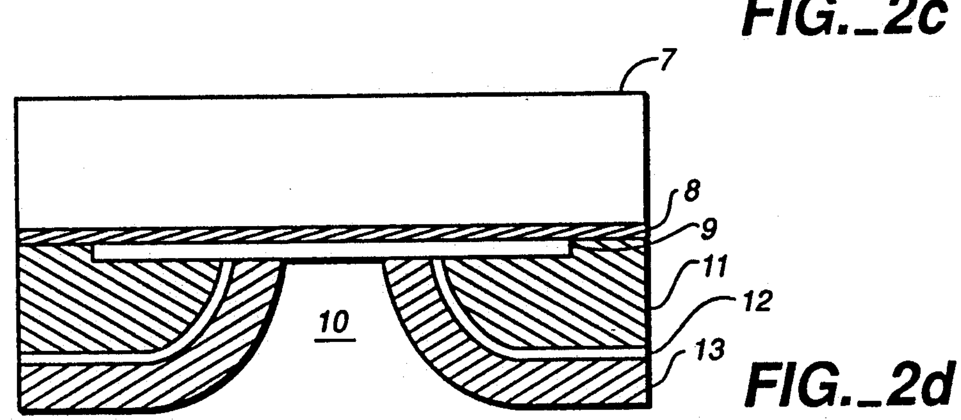
FIG._2d
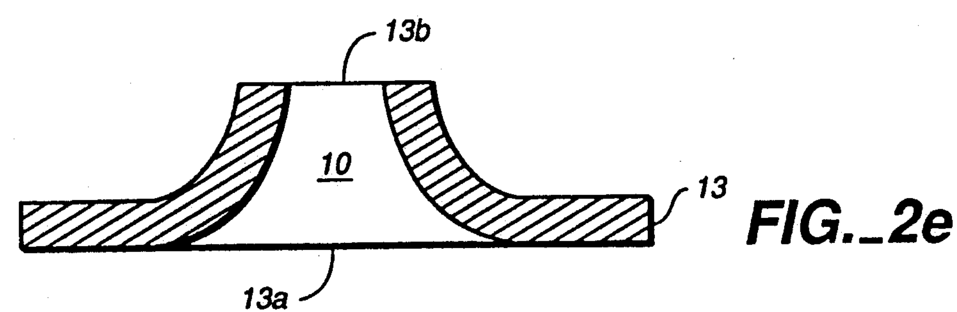
FIG._2e

THREE DIMENSIONAL NOZZLE ORIFICE PLATES

BACKGROUND OF THE INVENTION

1. Field of the Invention:

The present invention generally relates to nozzle plates for inkjet printers and, more particularly, to mandrels for use in manufacturing nozzle plates for inkjet printers.

2. State of the Art:

It is known to provide printheads for inkjet printers wherein the printheads each include a substrate, an intermediate barrier layer, and a nozzle plate including an array of nozzle orifices, each of which is paired with a vaporization chamber in the substrate. Also, a complete inkjet printhead includes means that connect the vaporization cavities to a single ink supply reservoir.

In conventional practice, a heater resistor is positioned within each vaporization cavity of a printhead. Typically, the resistors are of the thin film type. The heater resistors are connected in an electrical network for selective activation. More particularly, when a particular heater resistor receives a pulse, it rapidly converts the electrical energy to heat which, in turn, causes any ink immediately adjacent to the heater resistor to form an ink vapor bubble that ejects a droplet of ink from the orifice in the nozzle plate above the energized heater resistor. Thus, by appropriate selection of the sequence for energizing the heater resistors in an inkjet printhead, ejected ink droplets can be caused to form patterns on a paper sheet or other suitable recording medium.

In conventional practice, nozzle plates for inkjet printheads are formed of nickel and are fabricated by lithographic electroforming processes. One example of a suitable lithographic electroforming process is described in U.S. Pat. No. 4,773,971. In such processes, the orifices in a nozzle plate are formed by overplating nickel with a dielectric pillar pattern. Although such electroforming processes for forming nozzle plates for inkjet printheads have numerous benefits, they also have several shortcomings. One shortcoming is that the processes require delicate balancing of parameters such as stress and plating thicknesses, pillar diameters, and overplating ratios. Another shortcoming is that such electroforming processes inherently limit design choices for nozzle shapes and sizes.

An article entitled "The ThinkJet Orifice Plate: A Part With Many Functions" by Gary L. Siewell et al. in the Hewlett-Packard Journal, May 1985, pages 33–37, discloses an orifice plate made by a single electroforming step wherein nozzles are formed around pillars of photoresist with carefully controlled overplating. More particularly, the article discloses that a stainless steel mandrel is: (1) deburred, burnished, and cleaned; (2) a layer of photoresist is spun on the surface and patterned to form protected areas where manifolds are desired; (3) the exposed surface is uniformly etched to a specified depth; (4) the resist is removed and the mandrel is burnished and cleaned again; (5) a new coat of photoresist is spun on and patterned to define the barriers and standoffs; and (6) the barriers and standoffs are etched.

Further, the Siewell article discloses that the orifice plate can be made by: (1) laminating the stainless steel mandrel with dry film photoresist; (2) exposing and developing the resist so that circular pads, or pillars, are left where the orifices, or nozzles, are desired; (3) electroplating the mandrel with nickel on the exposed stainless steel areas including the insides of grooves etched into the mandrel to define the barrier walls and standoffs; (4) peeling the plating from the mandrel, the electroplated film being easily removed due to an oxide surface on the stainless steel which causes plated metals to only weakly adhere to the oxide surface; and (5) stripping the photoresist from the nickel foil. According to the article, the nickel foil has openings wherever the resist was on the mandrel. Still further, the article states that the resist is used to define edges of each orifice plate, including break tabs which allows a large number of orifice plates formed on the mandrel to be removed in a single piece, bonded to a mating array of thin-film substrates and separated into individual printheads.

In practice, the performance of ink jet printheads depends on the nozzle configurations in the printheads. Although high quality nozzle orifice plates have been made for inkjet printheads, there exists a need in the art for even higher quality configurations.

SUMMARY OF THE INVENTION

Generally speaking, the present invention provides a process of forming a mandrel for manufacturing inkjet orifice plates and the like In the preferred embodiment, the process includes the steps of providing an electrically-conductive layer on a substrate, providing a pattern of electrically conductive surfaces on the conductive layer, and surface treating the pattern of conductive surfaces to reduce adhesion of a subsequently applied electroplated film to the pattern of conductive surfaces.

In one particular embodiment, the second step includes etching the electrically conductive layer to form a pattern of electrically conductive regions on a glass substrate. The second step can also include electrodepositing a second electrically-conductive layer on the conductive regions. The second layer can be formed, for example, of nickel.

In another particular embodiment, the second step includes providing a dielectric material such as silicon carbide, silicon nitride, silicon oxide or another suitable dielectric on the conductive layer to define a pattern of electrically conductive regions. The second step can also include electro-depositing a second electrically conductive layer on the conductive regions to form the pattern of conductive surfaces Here again, the second layer can be nickel.

The third step preferably comprises oxidizing the pattern of conductive surfaces. For instance, the pattern of conductive surfaces can be exposed to an oxygen plasma process or the pattern of conductive surfaces can be immersed in a hot bath containing at least one hydroxide of an alkaline earth metal. The hydroxide can comprise potassium hydroxide. In this way, an oxide layer can be provided on the pattern of conductive surfaces, or an oxide-containing and hydroxide-containing layer can be provided on the pattern of conductive surfaces.

In practice, the mandrel comprises a substrate, a pattern of electrically conductive surfaces on the substrate and release means on the pattern of conductive surfaces for reducing adhesion of a subsequently applied electroplated film to the pattern of conductive surfaces. The substrate can comprise a glass substrate, the pattern of conductive surfaces can comprise a layer of nickel and the release means can comprise at least one of a nickel oxide and a nickel hydroxide surface layer on the layer of nickel. The pattern of conductive surfaces can be formed by a patterned layer of an electrically conductive material on the substrate and an electro-deposited layer of nickel on the layer of conductive material. Alternatively, the pattern of conductive surfaces can be formed by a layer of an electrically conductive material on the substrate, a pattern of dielectric material on the layer of conductive material and an electro-deposited layer of nickel on exposed portions of the layer of conductive material.

The mandrel can be used for electroforming an inkjet orifice plate, also called a nozzle plate herein. The nozzle plate can be made by a process including a first step of depositing material on a surface of a nickel mandrel, the surface having a least one of a nickel oxide and a nickel hydroxide film thereon for reducing adhesion of the deposited material on the nickel mandrel. The process also includes a second step of separating the deposited material from the nickel mandrel. The nickel mandrel can comprise a patterned layer of an electrically conductive material on a substrate, and a layer of electro-deposited nickel on the layer of conductive material Alternatively, the nickel mandrel can comprise a layer of electrically conductive material on a substrate, a pattern of dielectric material on the layer of conductive material and a layer of electro-deposited nickel on exposed portions of the layer of conductive material. The first step preferably comprises electro-depositing nickel as the deposited material.

A nozzle plate can be manufactured with the mandrel described above. The nozzle plate includes a metal plate having first and second opposed surfaces and at least one nozzle. The nozzle is defined by an inlet opening extending into the first surface of the metal plate and an outlet opening extending into the second surface of the metal plate. The nozzle includes an interior surface converging from the inlet opening to the outlet opening, and the interior surface extends a distance in a direction parallel to an axis passing through the inlet and outlet openings. This distance is greater than a thickness of the metal plate between the first and second surfaces thereby providing a three dimensional (three dimensional) nozzle plate. The metal plate can comprise an electro-deposited metal layer and the interior surface of the nozzle can comprise an electroformed surface of the electro-deposited layer. The metal layer can comprise nickel and the interior surface of the nozzle can comprise a very smooth and converging surface which is frustoconical in shape.

DESCRIPTION OF THE DRAWINGS

The present invention can be further understood with reference to the following description in conjunction with the appended drawings, wherein like elements are provided with the same reference numerals. In the drawings:

FIGS. 1*a*–*e* show various stages of making a mandrel and a nozzle plate in accordance with one aspect of the invention;

FIGS. 2*a*–*e* show various stages of making a mandrel and a nozzle plate in accordance with another aspect of the invention;

DETAILED DESCRIPTION OF PREFERRED EMBODIMENTS

Figure 3B:
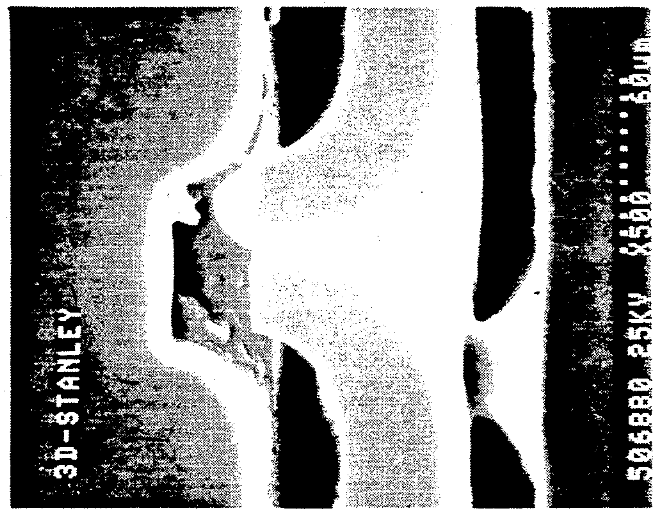
FIGS. 3*a*–*f* are photomicrographs of nozzle plates manufactured in accordance with the invention.
Figure 3A:
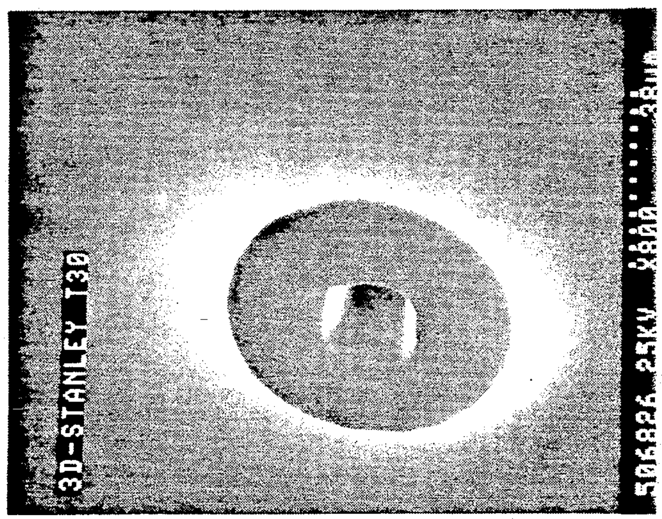
Figure 3D:
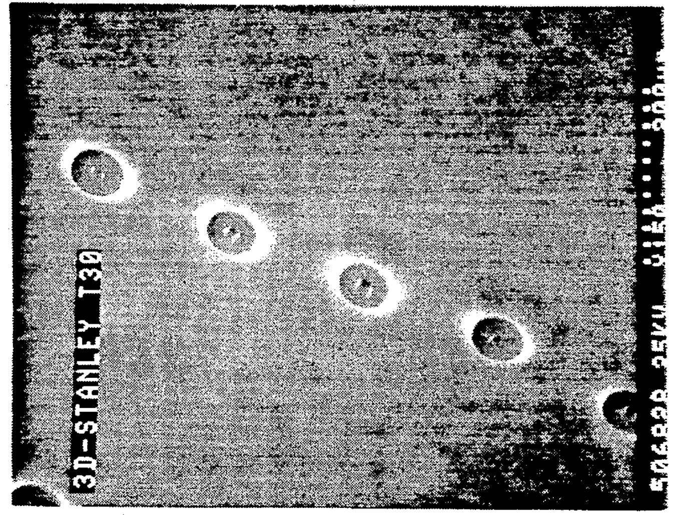
Figure 3C:
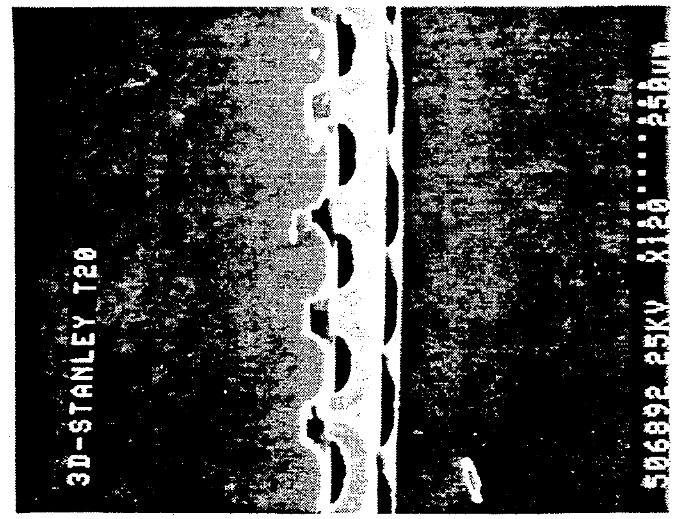
Figure 3F:
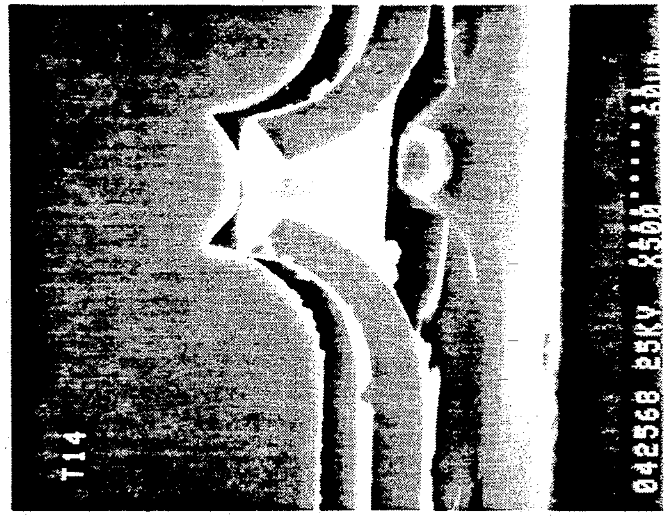
Figure 3E:
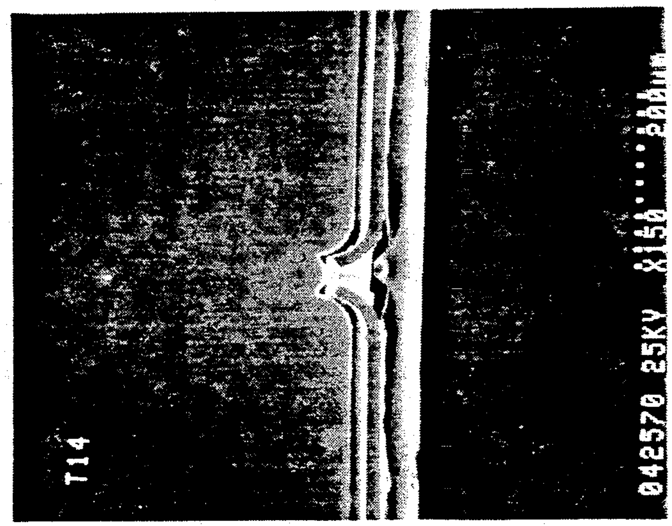

FIGS. 1*a*–*e* and 2*a*–*e* show different manufacturing processes for three dimensional nozzle orifice plates. In particular, these processes allow electroforming of relatively pure metal or an alloy for manufacturing orifice plates which can be used for thermal inkjet printheads.

FIGS. 1*e* and 2*e* show nozzle plates having a three dimensional type of nozzle configuration. The performance of an inkjet printhead which includes such a nozzle plate allows high quality printing. As shown in FIGS. 1*e* and 2*e*, the nozzle protrudes from the orifice surface. In particular, the outlet opening of the nozzle is separated from the inlet opening of the nozzle by a distance which is greater than the thickness of the nozzle plate. The nozzle plate can comprise an electro-deposited metal layer and the interior surface of the nozzle can comprise an electroformed surface of the electro-deposited layer. The electro-deposited layer can comprise nickel and the interior surface of the nozzle can comprise a very smooth and converging surface which is frustoconical in shape. As a result of being electro-deposited the thickness of the metal plate is substantially uniform from the inlet opening to the outlet opening, as shown in FIGS. 1*e* and 2*e*.

The mandrel for such three dimensional nozzle orifice plates can comprise a thin film mandrel such as a sheet of nickel which has a configuration suitable for manufacturing of orifice plates having convergent orifices. The nickel surface can be coated by nickel or a stainless steel thin film which will serve as an electroforming surface. The other portions of the mandrel surface can be coated with a non-conducting material such as a photoresist or plating tape. An electroforming process is carried out until the desired thickness is achieved for the orifice plates. Upon separation of the electroformed deposit from the mandrel, three dimensional nozzle orifice plates are obtained.

A first type of mandrel will now be described. As shown in FIG. 1*a*, a substrate 1 such as polished glass is coated with a conductive film layer 2. The conductive film layer 2 can comprise a single layer or multiple layers such as a first layer of chromium which bonds firmly to the substrate 1 and a second layer of stainless steel on the chromium layer. The conductive film layer 2 can be provided by a vacuum deposition process such as the planar magnetron process. The conductive film layer 2 is patterned by a suitable process such as photolithography. For instance, a photoresist layer can be provided on the conductive film layer 2, a photomask can be placed on the photoresist layer and the photoresist layer can be exposed to ultra violet light. The photoresist layer can be developed to obtain the photomask pattern into the photoresist layer and the unmasked areas can be etched to provide a patterned conductive film layer 2 which includes features to be incorporated into a nozzle plate which is electroformed on the mandrel. As shown in FIG. 1*a*, the patterned conductive layer 2 can include an opening 3 extending through the conductive layer 2 to the substrate 1.

The first type of mandrel allows a nozzle plate to be electroformed such that an outlet opening of a nozzle is formed adjacent the substrate 1. As shown in FIG. 1*b*, a layer of conductive material 4 is deposited on the conductive film layer 2 such that the opening 3 is defined in part by the substrate 1. The layer 4 preferably comprises an electro-deposited layer of nickel that extends from the conductive layer 2 such that the opening 3 converges towards the substrate 1. The layer 4 provides a pattern 4a of electrically conductive surfaces.

A release means 5 is provided on the layer 4 to facilitate removal of an electroformed nozzle plate subsequently formed on the pattern 4a of electrically conductive surfaces. Preferably, the release means 5 comprises an oxidized film on the layer 4. The oxidized film 5 can be provided by oxidizing the pattern 4a of electrically conductive surfaces. For instance, an oxygen plasma process can be used to provide the oxidized film 5. In the case where the layer 4 is made of nickel, the release means 5 can comprise a nickel oxide surface of about 10 to 100 Å in thickness on the layer 4. Another way of providing the oxidized film 5 is by immersing the layer 4 in a hot bath containing at least one hydroxide of an alkaline earth metal. For instance, the bath can comprise potassium hydroxide (KOH) which is heated to 80° C. and the layer 4 can be immersed for about two hours. In the case where the layer 4 is made of nickel, the KOH bath can form an oxide and a hydroxide containing layer on the pattern 4a of conductive surfaces.

The release means 5 reduces adhesion of a subsequently applied electroplated film to the pattern 4a of conductive surfaces. For instance, as shown in FIG. 1d, a material 6 is deposited on the layer 4 and the release means 5 allows easy separation of the material 6 in the form of a nozzle plate, as shown in FIG. 1e. The nozzle plate 6 is preferably an electro-deposited layer of nickel and includes an inlet opening 6a and an outlet opening 6b.

A second type of mandrel will now be described. As shown in FIG. 2a, a substrate 7 such as polished glass is coated with a conductive film layer 8. The conductive film layer 8 can comprise a single layer or multiple layers such as a first layer of chromium which bonds firmly to the substrate 7 and a second layer of stainless steel on the chromium layer. The conductive film layer 8 can be provided by a vacuum deposition process such as the planar magnetron process. A dielectric layer 9 such as silicon nitride, silicon carbide or other dielectric material is provided on the conductive film layer 8. The dielectric layer 9 can be provided by a suitable process such as a plasma enhanced chemical vapor deposition process and is patterned by a suitable process such as photolithography. For instance, a photoresist layer can be provided on the dielectric layer 9, a photomask can be placed on the photoresist layer and the photoresist layer can be exposed to ultra violet light. The photoresist layer can be developed to obtain the photomask pattern into the photoresist layer and the unmasked areas can be etched to provide a patterned dielectric layer 9 which defines a pattern of electrically conductive regions on the conductive layer 8. As shown in FIG. 2a, the patterned dielectric layer 9 can form a region 10 surrounded by exposed portions of the conductive layer 8.

The second type of mandrel allows a nozzle plate to be electroformed such that an outlet opening of a nozzle is formed adjacent the dielectric layer 9 and thus the height of the nozzle from an inlet opening to an outlet opening of the nozzle can be controlled to be less than that of the nozzle plate 6 formed on the first type of mandrel. As shown in FIG. 2b, a layer of conductive material 11 is deposited on the conductive film layer 8 such that the region 10 forms an opening defined in part by the dielectric layer 9. The layer 11 preferably comprises an electro-deposited layer of nickel which extends from the conductive layer 8 such that the opening 10 converges towards the dielectric layer 9. The layer 11 provides a pattern 11a of electrically conductive surfaces.

A release means 12 is provided on the layer 11 to facilitate removal of an electroformed nozzle plate subsequently formed on the pattern 11a of electrically conductive surfaces. Preferably, the release means 12 comprises an oxidized film on the layer 11. The oxidized film 12 can be provided by oxidizing the pattern 11a of electrically conductive surfaces For instance, an oxygen plasma process can be used to provide the oxidized film 12. In the case where the layer 11 is nickel, the release means 12 can comprise a nickel oxide surface of about 10 to 100 Å in thickness on the layer 11. Another way of providing the oxidized film 12 is by immersing the layer 11 in a hot bath containing at least one hydroxide of an alkaline earth metal. For instance, the bath can comprise potassium hydroxide (KOH) which is heated to 80° C. and the layer 11 can be immersed for about two hours. In the case where the layer 11 is nickel, the KOH bath can form an oxide and a hydroxide containing layer on the pattern 11a of conductive surfaces.

The release means 12 reduces adhesion of a subsequently applied electroplated film to the pattern 11a of conductive surfaces. For instance, as shown in FIG. 2d, a material 13 is deposited on the layer 11 and the release means 12 allows easy separation of the material 13 in the form of a nozzle plate, as shown in FIG. 2e. The nozzle plate 13 is preferably an electro-deposited layer of nickel and includes a nozzle having an inlet opening 13a and an outlet opening 13b with a smooth converging surface extending therebetween. The inlet and outlet openings can be spaced apart by a distance which is more than the thickness of the nozzle plate. In fact, this distance could be two or more times larger than the nozzle plate thickness.

Advantages of the first and second types of mandrels include precise control of the diameter of the nozzle opening, very smooth contour of the inner surface forming the nozzle opening and independent control of the height from the exit surface to the entrance surface. As a result, trajectory of the ink drop as it exits the nozzle opening can be controlled and high quality printing can be obtained. FIGS. 3a-f show features of a nozzle plate electroformed on one of the previously described mandrels having the release means 5, 12.

According to the prior art, a nozzle has been formed by electrical discharge machining with an annular electrode to form the outer configuration of the nozzle and a wire to form the opening of the nozzle. For instance, the nozzle opening described in the article entitled "Air-Assisted Ink Jet with Mesa-Shaped Ink-Drop-Forming Orifice" by Hue Le et al., The 4th International Congress on Advances in Non-Impact Printing Technologies, New Orleans, LA, March 1988, would have a cylindrical rather than a converging surface extending from the inlet opening to the outlet opening thereof. Also, this surface would be expected to exhibit surface roughness.

Figures 4A, 4B:
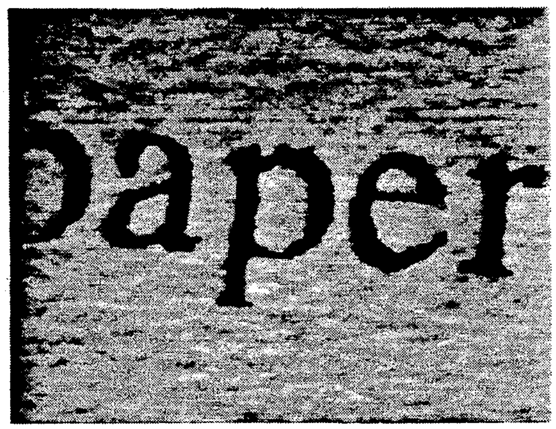
FIGS. 4*a*–*b* are photomicrographs of a printed pattern formed with a nozzle plate in accordance with the invention.

The interior surface of the nozzle openings shown in FIGS. 3a-f is much smoother than the interior surface of the nozzle opening described in the Le et al. article. Accordingly, the nozzle plate of FIGS. 3a-f will provide more precise control of the inkjet and much higher quality printing than would be obtainable with a nozzle plate having openings like the one described in the Le et al. article. For instance, the nozzle plates shown in FIGS. 3*a–f* allow high quality printing patterns to be obtained having well defined ink drop formations as shown in FIGS. 4*a* and 4*b*. It can be seen from FIGS. 4*a* and 4*b* that the ink drops can be deposited in patterns which have well-defined contours along the edges thereof.

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A nozzle plate for an inkjet printer comprising:

a metal plate having a first surface and an opposed second opposed surface and a plurality of nozzles, each nozzle being defined by an inlet opening extending into the first surface and an outlet opening extending into the second surface, and each nozzle including an interior surface converging from the inlet opening to the outlet opening, the interior surface extending a distance in a direction parallel to an axis passing through the inlet and outlet opening, the distance being greater than a thickness of the metal plate between the first surface and second surface and the thickness of the metal plate being substantially uniform from the inlet opening to the outlet opening.

2. The nozzle plate of claim 1, wherein the metal plate comprises a single electro-deposited metal layer, and the interior surface of the nozzle comprises an electroformed surface of the electro-deposited layer.

3. The nozzle plate of claim 2, wherein the metal layer comprises a smooth and converging surface which is frustoconical in shape.

* * * * *

UNITED STATES PATENT AND TRADEMARK OFFICE
CERTIFICATE OF CORRECTION

PATENT NO. : 5,255,017

DATED : October 19, 1993

INVENTOR(S) : Si-Ty Lam

It is certified that error appears in the above-indentified patent and that said Letters Patent is hereby corrected as shown below:

Column 8, line 18, after "comprises" insert -- nickel and the interior surface of the nozzle comprises --.

Signed and Sealed this

Fourth Day of October, 1994

*Attest:*

BRUCE LEHMAN

*Attesting Officer* *Commissioner of Patents and Trademarks*